(12) United States Patent
Pettitt et al.

(10) Patent No.: US 7,036,825 B2
(45) Date of Patent: May 2, 2006

(54) INTEGRALLY MOLDED LATERAL COMPRESSION SEAL

(75) Inventors: Edward Douglas Pettitt, Burt, NY (US); Ronald A. Lemmon, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 136 days.

(21) Appl. No.: 10/649,505

(22) Filed: Aug. 26, 2003

(65) Prior Publication Data

US 2005/0047853 A1   Mar. 3, 2005

(51) Int. Cl.
*F16J 15/02* (2006.01)
(52) U.S. Cl. .................. 277/628; 277/637; 277/641; 277/642
(58) Field of Classification Search .............. 277/628, 277/637, 641, 642
See application file for complete search history.

(56) References Cited

U.S. PATENT DOCUMENTS 3,815,311 A     6/1974  Nisula et al. ................. 52/579
5,295,341 A  *  3/1994  Kajiwara ................... 52/586.2
5,716,051 A  *  2/1998  Cornea et al. ............. 277/609
6,435,910 B1    8/2002  Blasko et al.

FOREIGN PATENT DOCUMENTS

| DE | 1609787 | 9/1971 |
| DE | 2701905 | 7/1978 |
| EP | 0414946 | 3/1991 |
| EP | 0761984 | 3/1997 |
| GB | 1361805 | 7/1994 |

OTHER PUBLICATIONS

EP 04 07 7308 European Search Report dated Sep. 27, 2005.

* cited by examiner

*Primary Examiner*—Vishal Patel
(74) *Attorney, Agent, or Firm*—Patrick M. Griffin

(57) ABSTRACT

A casing for a HVAC system in an automobile for moving air comprises a plurality of sections, each of which is molded of plastic material. The sections of the casing are connected and sealed to one another at a plurality of joints. The improvement resides in the tongue having a slot extending into the distal end thereof for splitting the tongue into first and second forks in frictional engagement with the side-walls of the groove. The forks are compressed together by the groove to narrow the slot from top to bottom to retain the tongue in the groove and to seal the sections together.

11 Claims, 3 Drawing Sheets

INTEGRALLY MOLDED LATERAL COMPRESSION SEAL

FIELD OF THE INVENTION

The subject invention relates to a casing for a heating and ventilation and air-conditioning (HVAC) system in an automobile.

BACKGROUND OF THE INVENTION

The HVAC systems generally incorporate molded plastic casing sections that are joined together by various means. If the joint between the sections of the casing does not have an air tight seal then it is possible for air to leak from the casing, which results in a loss of comfort in the passenger compartment, a whistle type noise, or both. The noise can cause a reject by the vehicle assembly plants and increased warranty costs.

There are several methods to provide sealing at the joints of the casing. One method is to use a tongue and groove joint. To maintain moldability of the casing section and assemble-ability, the tolerances are such that only at maximum material condition does the tongue have line on line contact in the groove. At all other conditions, there is a gap between the tongue along the flat surfaces surrounding the tongue, i.e., the surface from which the tongue extends. The warping of the casing and possible spreading of the casing can open up this gap at the joint thereby allowing air to flow around the tongue and through the outer gap and creating a leak and/or whistle. Other methods relate to putting a sealing material, such as foam or sealant, between the two sections of the casing to seal any irregularities. These additional seals add cost and can be miss-assembled. It is desirable to provide positive sealing without using separate or additional foam pieces that can increase production time and increase costs.

SUMMARY OF THE INVENTION AND ADVANTAGES

The invention improves the tongue and groove joint between two components of a heating and ventilation and air-conditioning system in an automobile. The joint includes a groove in a first component and a tongue extending from a second component to a distal end in the groove and the tongue has a slot extending into the distal end thereof for splitting the tongue into first and second forks in frictional engagement with said groove.

This invention uniquely addresses the issues inherent with the traditional solid tongue and groove design. The traditional solid tongue and groove requires excessive force to put it together if designed with interference fit. However, the split tongue will simply flex when inserted in the groove and thus create an air tight seal at reasonable assembly forces. The plastic tongue will be formed such that there is a "split" or very narrow slot in the middle of the tongue so that the forks of the tongue will flex inwards when inserted in a mating groove.

The forked tongue and groove joint allows designing an interference fit with current molding tolerances and capabilities, eliminates potential for air leakage resulting in whistles and performance degradation, improves seal integrity as pressure rises in the casing as high pressure air will tend to force the forked tongue to expand and increase the sealing effect, and eliminates the need for a foam case seal.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
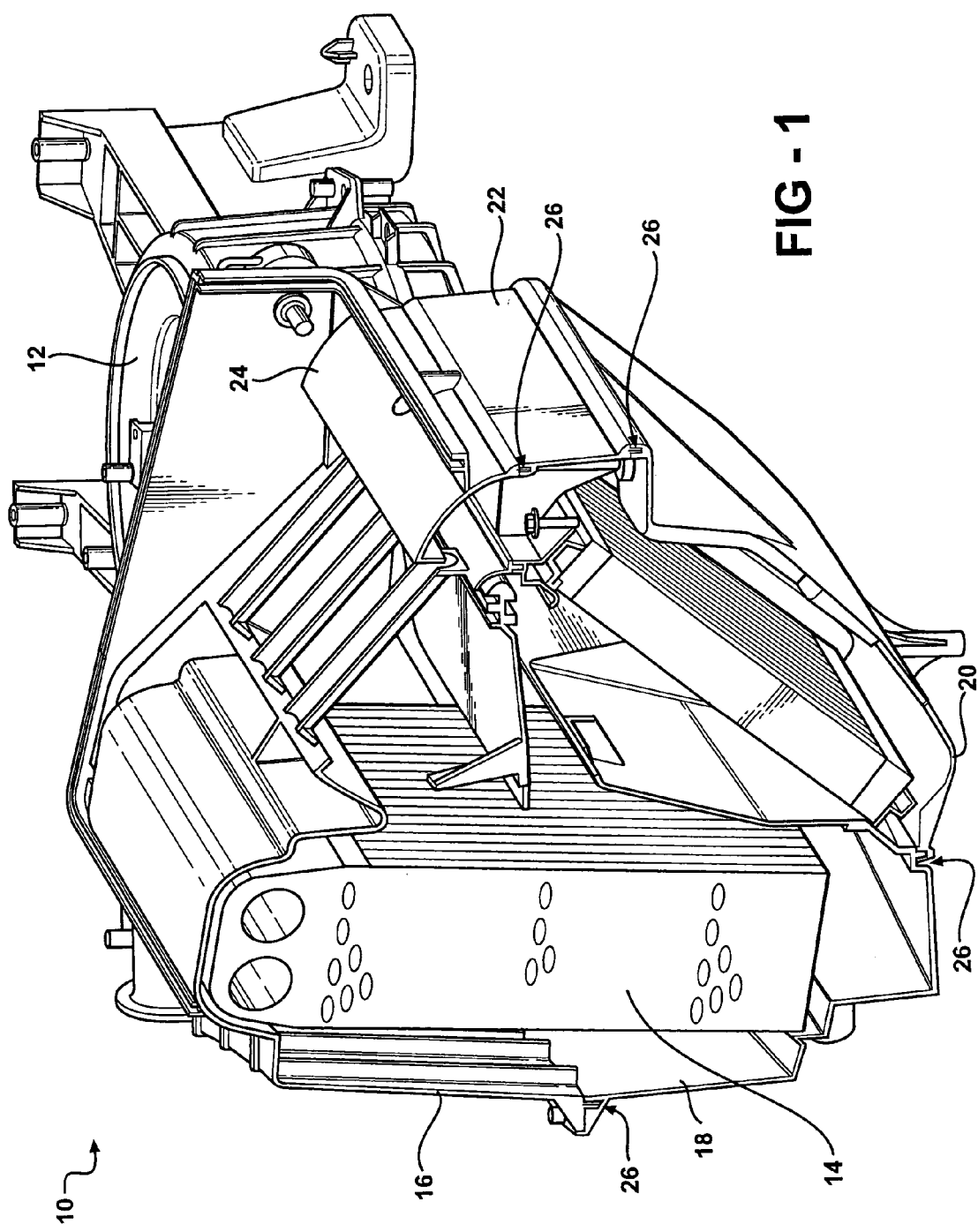
FIG. 1 is a perspective view of a heating and air conditioning module in which the subject invention has utility.

A casing for a heating and ventilation and air-conditioning (HVAC) system in an automobile is generally shown at 10 in FIG. 1. As is well known, the system includes a blower 12 in the casing 10 for moving air through the casing 10 and a heat exchanger 14 in the casing 10 for exchanging heat with the fluid flowing through the casing 10. The casing 10 comprises a plurality of sections or components 16–24, each of which is molded of plastic material. The sections 16–24 of the casing 10 are connected and sealed to one another at a plurality of joints, each of which is generally indicated at 26. As will be appreciated, the joint 26 can be used in various environments other than a HVAC system to connect and seal the periphery of two plastic components or sections thereof together. For example, the joints 26 could connect and seal the various modules of the HVAC system as well as other components.

Figure 3:
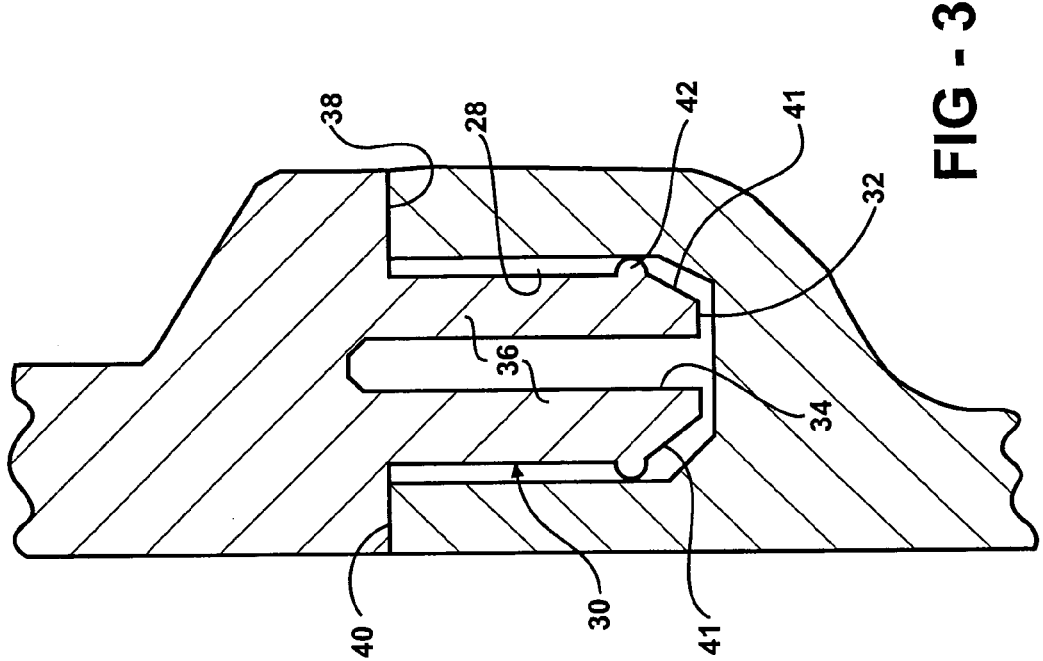
FIG. 3 is a cross sectional plan view of a second embodiment of the subject invention.
Figure 2:
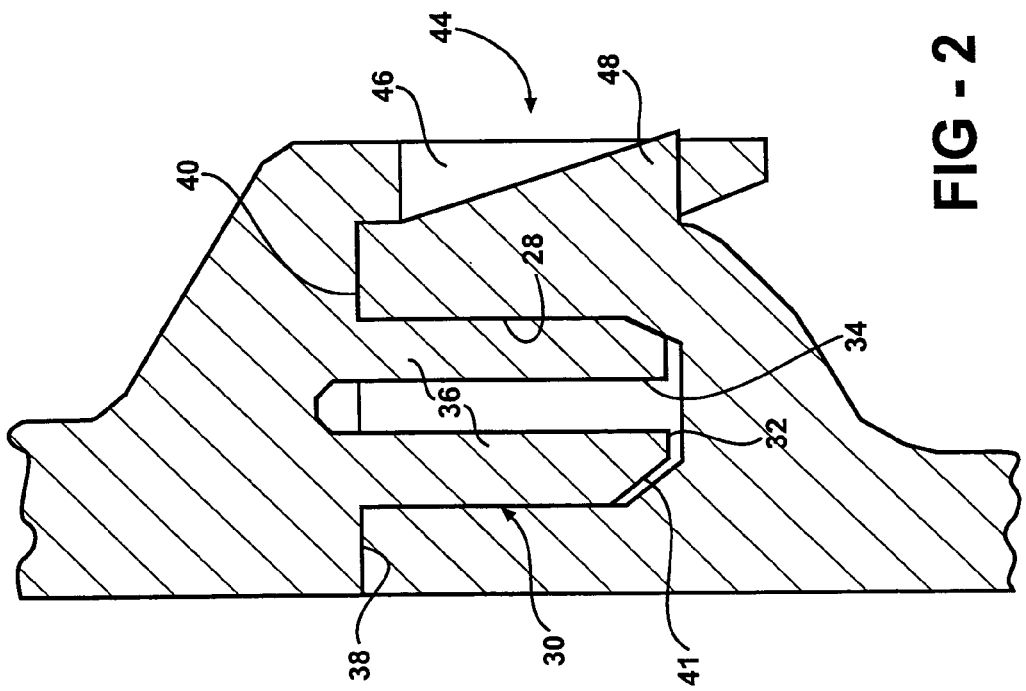
FIG. 2 is a cross sectional view of a first embodiment of the subject invention.
Figure 4:
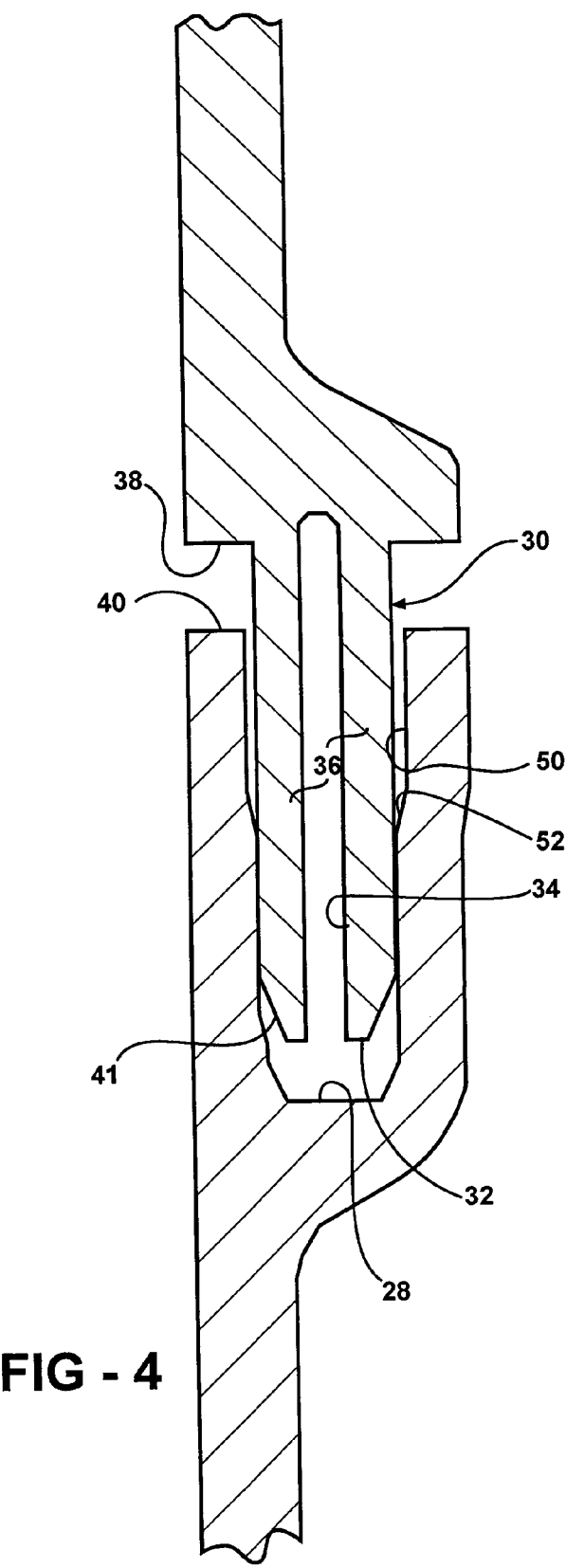
FIG. 4 is a cross sectional plan view of a third embodiment of the subject invention.

As illustrated in FIGS. 2, 3 and 4 each of the joints 26 seals the sections 16–24 together to prevent leakage of air flow through the casing 10 and includes a groove 28 in the first section and a tongue, generally indicated at 30, extending from the second section to a distal end 32 in the groove 28.

The improvement resides in the tongue 30 having a slot 34 extending into the distal end 32 thereof for splitting the tongue 30 into first and second forks 36 in frictional engagement with the side-walls of the groove 28. The forks 36 are compressed together by the groove 28 to narrow the slot 34 from top to bottom to retain the tongue 30 in the groove 28. As will be appreciated, the tongue 30 and groove 28 extend along the joint 26 between the sheet-like walls of the sections of the casing 10.

Each tongue 30 extends from a latterly extending flange surface 38 to present a shoulder on either side of the tongue 30 and a sealing surface 40 is disposed on either side of the groove 28 for engaging the shoulders of the surface 38 in the embodiments of FIGS. 2 and 3. The groove 28 has a bottom and the distal end 32 of the tongue 30 is spaced from the bottom when the surface 38 defining the shoulders engages the sealing surface 40 on either side of the groove 28. In other words, the groove 28 is deeper than the tongue 30 to prevent the tongue 30 from bottoming out in the groove 28.

However, in the embodiment of FIG. 4, the flange surface 38 remains spaced from the sealing surface 40 when the tongue 30 is fully inserted into the groove 28.

The distal ends 32 of the forks 36 of the tongue 30 are tapered inwardly sixty degrees (60°) to facilitate insertion of the tongue into the groove 28. Additionally, the sides of the tongue 30 are tapered five degrees (5°) in draft. Furthermore, the sides of the tongue 30 are normally 0.2 mm (0.008 inch) wider than the width of the groove 28, i.e., distance between side-walls, to define an interference fit.

As shown in FIG. 3, a sealing bead 42 may be optionally included to extend along the sides of the tongue 30 for sealing engagement with the side-walls of the groove 28.

As another option, a snap together connection 44 in FIG. 2 may be disposed adjacent the tongue 30 and groove 28 for holding the sections together. The connection 44 includes a male tang 46 having an opening therein for receiving and snapping over a ramp 48. The ramp 48 is disposed in the opening in the tang 46 to hold the sections together.

As illustrated in FIG. 4, the groove 28 may include a lead-in portion 50 having a greater width than the bottom portion of the groove 28. The lead-in portion 50 is connected to the bottom narrow portion of the groove 28 by tapered shoulders 52 that facilitate the entry of the tongue 30 into the groove 28. The tapered shoulders 52 are also disposed at sixty degrees (60°).

Although described in connection with a HVAC system, the subject invention has utility in sealing components of cases in general, particularly plastic cases.

Obviously, many modifications and variations of the present invention are possible in light of the above teachings. The invention may be practiced otherwise than as specifically described within the scope of the appended claims.

What is claimed is:

1. A heating and ventalation and air conditioning system comprising;
   a casing including first and second sections of plastic material,
   a blower in said casing for moving air through said casing,
   a heat exchanger in said casing for exchanging heat with the fluid flowing through said casing,
   a joint for sealing said sections together to prevent leakage of the fluid flowing through said casing,
   said joint including a groove in and extending along said first section and a tongue extending from and along said second section to a distal end in said groove,
   said tongue having a wider dimension than said groove to provide an interference fit of said tongue into said groove,
   said tongue having a slot extending into said distal end thereof for splitting said tongue into first and second forks to compress said forks together by said groove as said tongue is inserted into frictional engagement with said groove to narrow said slot from top to bottom to retain said tongue in said groove.

2. A system as set forth in claim 1 wherein said groove and said forks have straight sides and with said forks being compressed together by said groove as said straight sides are in sliding engagement to narrow said slot from top to bottom to retain said tongue in said groove.

3. A system as set forth in claim 1 wherein said tongue extends from a latterly extending flange surface to present a shoulder on either side of said tongue, said first section presenting a sealing surface on either side of said groove.

4. A system as set forth in claim 3 wherein said groove has a bottom and said distal end of said tongue is spaced from said bottom when said shoulders engage said sealing surface.

5. A system as set forth in claim 4 wherein said distal ends of said forks of said tongue are tapered inwardly to facilitate insertion of said tongue into said groove.

6. A system as set forth in claim 3 wherein said groove has a bottom and said distal end of said tongue is spaced from said bottom and said shoulders are spaced from said sealing surface.

7. A system as set forth in claim 6 wherein said distal ends of said forks of said tongue are tapered inwardly to facilitate insertion of said tongue into said groove.

8. A system as set forth in claim 6 wherein said groove includes a narrow bottom portion and a wider lead-in portion, said lead-in portion being spaced from said groove.

9. A system as set forth in claim 8 including a tapered shoulder connecting said wider portion to said narrow portion.

10. A system as set forth in claim 1 including a sealing bead extending along each side of said tongue for sealing engagement with said groove.

11. A system as set forth in claim 1 including a snap together connection adjacent and spaced from said tongue and groove for holding said sections together independently of said tongue and groove.

* * * * *